United States Patent
Caillerie et al.

(10) Patent No.: US 9,420,225 B2
(45) Date of Patent: Aug. 16, 2016

(54) COMMUNICATION OF VIDEO INFORMATION

(75) Inventors: Alain Caillerie, Rennes (FR); Yacine El Kolli, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 13/597,873

(22) Filed: Aug. 29, 2012

(65) Prior Publication Data

US 2013/0057767 A1 Mar. 7, 2013

(30) Foreign Application Priority Data

Sep. 1, 2011 (GB) .................................. 1115122.2

(51) Int. Cl.
*H04N 5/38* (2006.01)
*H04N 7/06* (2006.01)
*H04N 7/12* (2006.01)

(52) U.S. Cl.
CPC ................ *H04N 7/063* (2013.01); *H04N 7/127* (2013.01)

(58) Field of Classification Search
CPC .............................. H04N 7/127; H04N 7/063
USPC ................... 348/575, 723; 375/240
See application file for complete search history.

(56) References Cited

U.S. PATENT DOCUMENTS

| | | | |
|---|---|---|---|
| 6,788,686 B1 * | 9/2004 | Khotimsky et al. | 370/394 |
| 6,868,083 B2 * | 3/2005 | Apostolopoulos et al. | 370/392 |
| 2002/0114332 A1 * | 8/2002 | Apostolopoulos et al. | 370/392 |
| 2003/0107998 A1 * | 6/2003 | Mowery et al. | 370/252 |
| 2004/0179598 A1 * | 9/2004 | Zhou et al. | 375/240.11 |
| 2007/0189383 A1 | 8/2007 | Shao et al. | |
| 2009/0021646 A1 * | 1/2009 | Shao et al. | 348/608 |
| 2009/0028247 A1 * | 1/2009 | Suh et al. | 375/240.25 |
| 2009/0060081 A1 * | 3/2009 | Zhang et al. | 375/267 |
| 2010/0265392 A1 * | 10/2010 | Shao et al. | 348/446 |
| 2011/0026594 A1 * | 2/2011 | Jung et al. | 375/240.12 |
| 2011/0273622 A1 * | 11/2011 | Ngo et al. | 348/663 |
| 2012/0106647 A1 * | 5/2012 | Jung et al. | 375/240.16 |

FOREIGN PATENT DOCUMENTS

| | | | |
|---|---|---|---|
| FR | 2958823 A1 | 10/2011 | |
| WO | 2007094630 A1 | 8/2007 | |
| WO | WO 2011001078 A1 * | 1/2011 | |

\* cited by examiner

*Primary Examiner* — Christopher S Kelley
*Assistant Examiner* — Zhihan Zhou
(74) *Attorney, Agent, or Firm* — Canon USA, Inc. I.P. Division (57) ABSTRACT

A method of transmitting a video frame over a plurality of communication channels involves selecting a number of communication channels available between the transmitting and the receiving devices; partitioning spatially correlated pixels of the video frame into a number of different partitions equal to the number of selected communication channels; and transmitting the different partitions, where each partition is transmitted on a distinct communication channel among the selected communication channels.

Such a method is suitable for use in a communication system, especially a wireless communication system, in which data of a channel can be lost or corrupted. The method can maximize diversity in the transport of the video frame pixels and improve robustness.

17 Claims, 6 Drawing Sheets

COMMUNICATION OF VIDEO INFORMATION

CROSS REFERENCE TO RELATED APPLICATIONS

This application claims the benefit under 35 U.S.C. §119(a)-(d) of United Kingdom Patent Application No. 1115122.2, filed on Sep. 1, 2011 and entitled "Communication of video information".

The above cited patent application is incorporated herein by reference in its entirety

BACKGROUND OF THE INVENTION

1. Field of the Invention

This invention relates to the field of communication of video information and more particularly to wireless communication of uncompressed video information.

2. Description of the Background Art

US patent application 2009/0021646 discloses a system and a method of communicating uncompressed video information that facilitates the application of error concealment schemes particularly when a receiver has limited buffering memory. The method consists in partitioning neighboring (spatially correlated) pixels into a predetermined number of different partitions and placing pixels from the different partitions into different packets for transmission. The objective being that if pixel information in a received packet is corrupted (lost or damaged), one or more other packets which contain pixels that are spatially correlated to the corrupt pixel(s) would be used to recover the corrupt pixel information.

The disclosed system concerns a wireless transmitter and a wireless receiver both implementing directional antennas operating at a 60 GHz frequency band and forming beam paths between the transmitter and the receiver. The different packets are transmitted on one or more paths depending on the bandwidth capacity of each path. Typically, the different packets are transmitted on a single path if the quality of this path satisfies the video transmission requirements or distributed over more than one path if the combination of paths is necessary to have the required capacity.

Although it is desirable to achieve robustness by creating diversity, it is not always possible to send different packets on distinct paths because of constraints such as the offered capacity of the paths as particularly taught by the above cited prior art.

The present invention has been devised to address at least the foregoing concern. More specifically, an object of the present invention is to improve the robustness of video information transmission in a wireless system. Preferably this improvement should be achieved with no or no significant additional information overhead.

SUMMARY OF THE INVENTION

To this end, the present invention provides according to a first aspect a method of transmitting a video frame from a transmitting device to a receiving device. The method comprising the following steps executed in the following order:
selecting a number of communication channels available between the transmitting and the receiving devices;
partitioning spatially correlated pixels of the video frame into a number of different partitions equal to the number of selected communication channels; and
transmitting the different partitions where each partition is transmitted on a distinct communication channel among the selected communication channels.

Consequently, the way the spatially correlated pixels are partitioned is dependent on the communication channels that are available between the transmitter and the receiver and thus is adapted to channel conditions (capacity, signal to noise ratio of received signals, bit error rate, etc.) which may vary depending on the communication environment as the presence of obstacles. The number of partitions is thus adapted to guarantee that different partitions are always transmitted on distinct communication channels. Improved robustness is thus achieved.

According to a preferred implementation, the partitioning step comprises the steps of:
defining blocks of pixels for partitioning the pixels of the video frame (referred to as partitioning blocks) wherein the number of pixels per block equals the selected number of available communication channels, and
assigning each pixel of a block to a distinct partition.

Thus by defining appropriate block size it is possible to adapt the number of partitions to any number of available communication channels. This guarantees to have a full diversity within each partitioning block and thus maximizes the diversity of the communication channels transporting the pixels neighbouring the pixel to be reconstructed Advantageously, the shape of the defined partitioning blocks is also determined based on the number of selected communication channels. This makes it possible to control how lost or damaged pixels are distributed in a recomposed image at the receiver side so that to increase diversity.

In one implementation, if the number of selected communication channels has a non-integer square root and is not a prime number, the partitioning block has a rectangular shape having as its two dimensions two divisors of said number which are closest to each other and whose product equals said number of communication channels.

In one implementation, if the number of selected communication channels has a non-integer square root and is a prime number, the block has a linear shape.

In one implementation, the partitioning comprises staggering of linear shape blocks to avoid whole columns and diagonals of the video frame being in the same partition.

In one implementation, the selecting step is executed each time the number of available communication channels changes so that to optimize communication system performances.

In one implementation, the partitioning step is executed each time the selected number of communication channels changes to adapt the number of partitions to the number of selected communication channels. This keeps the number of partitions constantly matching the number of available communication channels and hence maintains the conditions for having optimal robustness and performance for error concealment.

In one implementation, different communication channels correspond to different transmission time slots and/or different transmission paths. This creates temporal and spatial diversity when transmitting over the different communication channels.

In a preferred implementation, only communication channels based on distinct transmission paths are selected in the selecting step to favour spatial diversity.

In one implementation, the maximum number of communication channels is selected at the selecting step among the available communication channels. The aim is to handle the maximum number of paths, and thus temporal and/or spatial diversity is increased.

In one implementation, the step of transmitting the partitions comprises a step of placing pixels from different partitions into different packets. This prevents the corruption of different partitions if only one packet is lost or damaged.

In one implementation, the transmitting method further comprising transmitting via at least one said communication channel information for use by the receiving device to identify the partitioning blocks. Preferably, the information comprises one or more of the following features of a partitioning block: a size of the block, a shape of the block, a dimension of the block, the number of pixels contained in the block.

The invention also concerns a video packet comprising one partition taken from a number of different partitions obtained by partitioning spatially correlated pixels of a video frame using partitioning blocks and further comprising information including one or more of the following features of a partitioning block: a size of the block, a shape of the block, a dimension of the block, the number of pixels contained in the block.

According to a second aspect, the invention provides a method of receiving a video frame transmitted by the transmitting method described above, wherein in the event that data of a pixel belonging to one said partition is lost or corrupted in transmission, received data of one or more pixels belonging to one or more other said partitions is employed to produce an estimate of the lost or corrupted data.

In one implementation, the receiving method comprising defining a reconstruction block for a target pixel having lost or corrupted data, the reconstruction block comprising predetermined pixels that neighbour the target pixel and that belong to said other partitions.

In one implementation, the reconstruction block is different from the partitioning block.

According to a third aspect, the invention provides a method of receiving a video frame transmitted by the transmitting method described above, comprising receiving from the transmitting device information about the number of selected communication channels and employing the received information to determine the partitioning applied by the transmitting device.

According to a fourth aspect, the present invention provides a transmitting device for transmitting a video frame to a receiving device. The transmitting device comprising:
  means for selecting a number of communication channels available between the transmitting and the receiving devices;
  means for partitioning spatially correlated pixels of the video frame into a number of different partitions equal to the number of selected communication channels; and
  a wireless transmitter for transmitting the different partitions where each partition is transmitted on a distinct communication channel among the selected communication channels.

The means for selecting and the means for partitioning being operated in this order when the transmitting device is in operation.

According to a preferred implementation, the means for partitioning comprises:
  means for defining blocks of pixels wherein the number of pixels per block equals the selected number of available communication channels, and
  means for assigning each pixel of a block to a distinct partition.

Advantageously, the shape of the defined blocks is determined based on the number of selected communication channels.

The present invention also extends to programs which, when run on a computer or processor, cause the computer or processor to carry out the method described above or which, when loaded into a programmable device, cause that device to become the device described above. The program may be provided by itself, or carried by a carrier medium. The carrier medium may be a storage or recording medium, or it may be a transmission medium such as a signal. A program embodying the present invention may be transitory or non-transitory.

The particular features and advantages of the transmitting device and the program being similar to those of the method for transmitting a video frame, they are not repeated here.

DETAILED DESCRIPTION OF THE INVENTION

Figure 1:
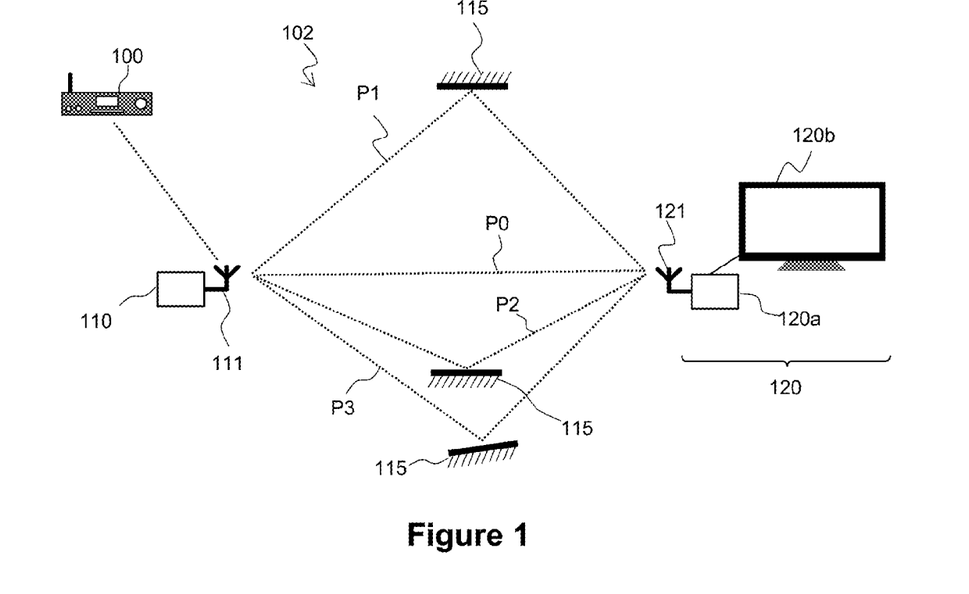
FIG. 1 depicts for illustrative purposes a wireless communication network employing spatial diversity.

FIG. 1 depicts for illustrative purposes a wireless communication network 102 employing spatial diversity. Spatial diversity relies on the use of a plurality of transmission paths between communicating devices. Typically, wireless communication network 102 operates in the unlicensed 60 GHz frequency band (millimeter waves) for providing enough bandwidth capacity to support the transport of uncompressed HD video content.

Network 102 comprises a first device 110 embodying a transmitter (Tx) and a second device 120 embodying a receiver (Rx). In this particular example, the second device 120 is composed of a communication device 120a connected to the wireless network and of a display device 120b connected to the communication device 120a for rendering the received data content, e.g. displaying the video. It is to be noted that the first device 110 may also represent a relay device, the originator of the data being then represented by another device 100 belonging to the communication network. It is common to have a meshed network comprising relay devices for relaying data between different devices to cope with the short range of the millimeter waves.

A signal emitted by antenna 111 of first device 110 may reach antenna 121 of second device 120 through a line-of-sight (LOS) transmission path P0 if it is not blocked by any obstacle. In addition, the signal may be reflected by objects 115 which may cause the establishment of a plurality of non line-of-sight (NLOS) transmission paths P1, P2 and P3.

Transmission paths P0, P1, P2, P3 may be created by different radiation patterns/configurations of antenna 111 of first device 110 and detected by different receiving patterns/configurations of antenna 121 of second device 120. A narrow beam antenna (directional antenna) can be used at the first device 110 when emitting a signal and/or at the second device 120 when receiving a signal. Steering an antenna to a given orientation corresponds to configuring its parameters (for example the weighting coefficients associated with the elements of an antenna array) such that the radiation of the signal, in case of emission, or the antenna sensitivity, in case of reception, is accentuated in that given direction relatively to other directions.

The setting up of a plurality of transmission paths in wireless communication network 102 is advantageously used in the present invention to create a plurality of communication channels between the transmitter Tx and the receiver Rx over which radio packets are transmitted.

Figure 2:
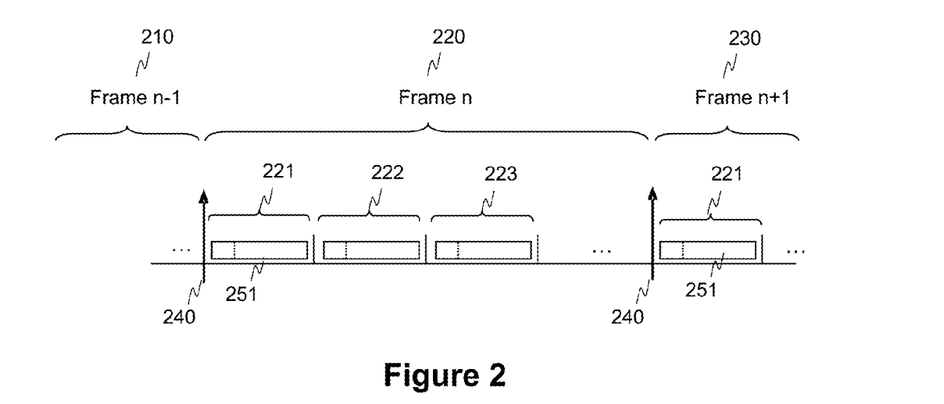
FIG. 2 depicts a time division multiplexing (TDM) used for sharing access to the radio medium.

In one embodiment of the invention, time division multiplexing (TDM) is used for sharing access to the radio medium as depicted in FIG. 2. A plurality of time slots 221, 222, 223, ... are provided periodically in every frame 210, 220, 230. The start of a frame is signaled by means of a beacon signal 240 consisting of a predetermined pattern of data symbols. A communication channel is created by associating one given time slot of a series of frames, e.g. 221, with one given transmission path. Sending radio packets, e.g. 251, over said communication channel corresponds to configuring transmitter antenna 111 to radiate in at least the direction of the given transmission path and emitting radio signals representative of said radio packets during the given time slot 221 in the series of frames. Receiving data from said communication channel corresponds to configuring receiver antenna 121 to be sensitive in at least the direction of the given transmission path and receiving radio signals representative of said data during the same given time slot in the series of frames. Consequently, different communication channels correspond to different transmission time slots and/or different transmission paths.

In another embodiment of the invention, a frequency division multiple access (FDMA) scheme may be used for sharing the radio medium. A communication channel is then created by associating one given carrier frequency with one given transmission path. Sending data over said communication channel corresponds to configuring transmitter antenna 111 to radiate in at least the direction of the given transmission path and emitting radio signals representative of said radio packets by modulating the given carrier frequency. Receiving radio packets from said communication channel corresponds to configuring receiver antenna 121 to be sensitive in at least the direction of the given transmission path and receiving signals representative of said radio packets by demodulating the given carrier frequency. Consequently, different communication channels correspond to different carrier frequencies and/or different transmission paths.

In a further embodiment, the two above embodiments are combined. A communication channel is created by associating one given transmission path with both one given time slot of a series of frames and one given carrier frequency. Consequently, different communication channels correspond to different carrier frequencies and/or different transmission time slots and/or different transmission paths.

In a variant implementation of the invention, the first device 110 and second device 120 each embodies both a transmitter and a receiver to establish a bi-directional communication. This makes it possible for example to insert feedback control information in the data flow transmitted in the reverse direction from the second device to the first device. In this implementation variant, the two devices share the same hardware platform. An apparatus based on this hardware platform is referred to generically hereinafter as a communication device.

Figure 3:
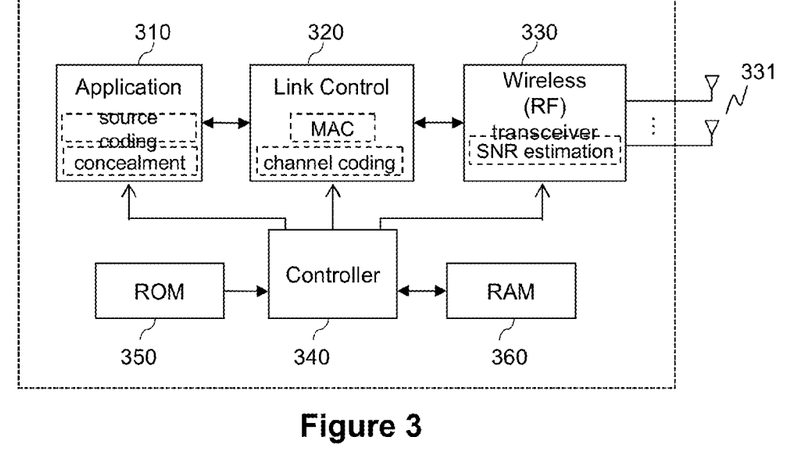
FIG. 3 illustrates a functional block diagram of a communication device that implements both a transmitter and a receiver.

FIG. 3 illustrates a functional block diagram of a communication device 300 that implements both a transmitter Tx and a receiver Rx. Communication device 300 includes a wireless transceiver (transmitter-receiver) 330, a link control unit 320 and an application unit 310, each of which is also coupled to a controller 340. The communication device furthermore includes a ROM 350 and a RAM 360 (computer readable storage medium) for data and program storage.

Typically, controller 340 is embodied as a central processing unit (CPU), which operates in accordance with a program stored in the ROM 350. The controller provides a work area in the RAM 360, and accesses and uses the work area during operation.

The wireless transceiver 330 is typically radio frequency (RF) transceiver circuitry that is connected to an antenna 331. The RF transceiver performs functions such as modulation/demodulation, signal-to-noise ratio (SNR) estimation and antenna control.

The link control unit 320 performs functions of media access control (MAC) and channel coding for protecting packets against channel errors by encoding the packets using an error correction code at the transmitter and decoding the received packets at the receiver.

When the communication device 300 is acting as a transmitter, application unit 310 generates video packets from a video bitstream delivered by a local or remote video source such as a HD player or set-top box for example. Optionally, source coding can be applied to individually compress generated video packets. An example of packetizing the video stream into video packets is described below with reference to FIG. 4.

When the communication device 300 is acting as a receiver, application unit 310 generates a video bitstream for display or storage for example from received video packets comprising pixel values possibly corrupted with errors or missing. Corrupted or missing pixel values are reconstructed using error concealment techniques as will be described later with reference to FIGS. 7a to 7e.

Controller 340 will normally control overall data processing over the received or to be transmitted video data, whereas signal processing operations associated with communication functions are typically performed in RF transceiver circuitry 330.

The transmission of the video packets over the physical medium is controlled by the link control unit 320. Necessary protocol overhead information is appended to the video packets, in header and possibly trailer parts, thus forming physical packets, also referred to as radio packets when transmitted over a radio communication channel (cf. reference 251 in FIG. 2).

Figure 4:
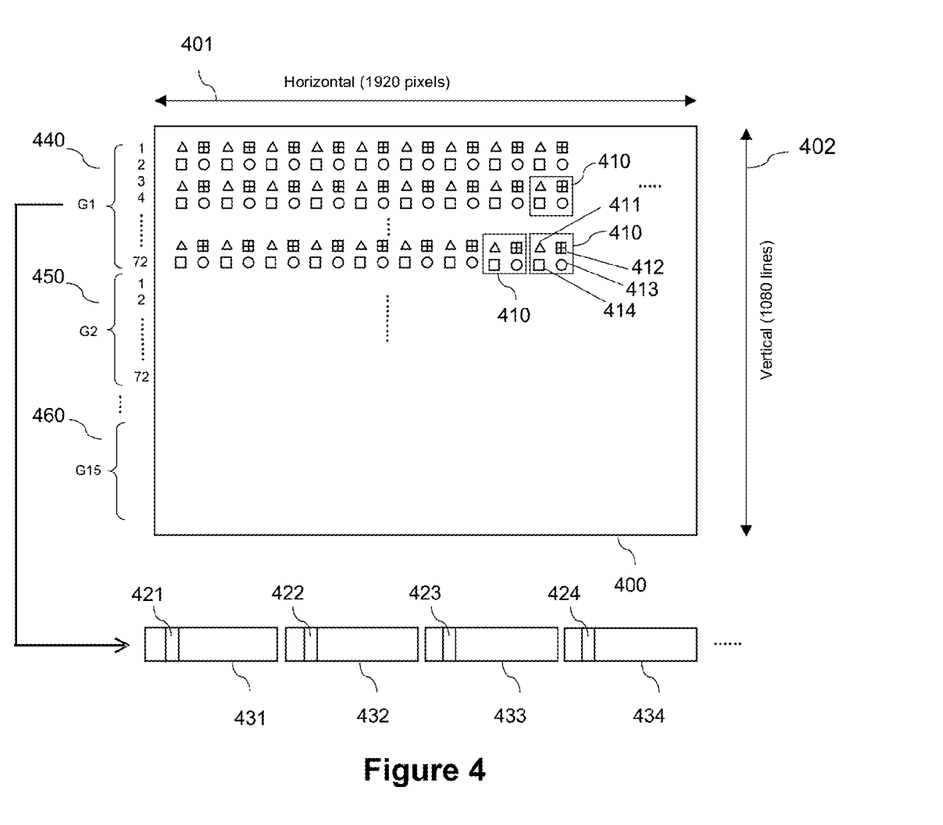
FIG. 4 shows an example of an uncompressed video frame and its packetizing scheme into video packets.

Referring to FIG. 4, a scheme of packetizing a video stream into video packets is now described.

FIG. 4 shows an example of an uncompressed video frame 400 formed typically of 1080 rows (vertical axis 402) of 1920 pixels each (horizontal axis 401). Video frame pixels are grouped into blocks 410 of spatially correlated pixels. These blocks will be referred to hereinafter as partitioning blocks. Pixels of each partitioning block are partitioned to different video packets and each video packet is transmitted in a different communication channel.

In the illustrated example, each of the pixel blocks 410 includes four pixels 411, 412, 413 and 414 which are represented by different symbols. The four partitions of the different blocks are included in four different packets 431, 432, 433 and 434. The positions 421, 422, 423 and 424 represent the values of pixels 411, 412, 413 and 414 of one pixel block respectively. Video frame 400 is divided into 15 groups 440, 450, . . . , 460 of 72 rows each. Pixel values of first group 440 are all transported in the four packets 431, 432, 433 and 434. Pixels values of second group 450 are similarly partitioned to a second set of four packets (not represented) and these four packets are transmitted over different communication channels, and so on. In the present example, pixel values of the whole frame are transported into 15×4 video packets.

The aim of partitioning is to create diversity in the communication channels transporting the pixels neighbouring the pixel to be reconstructed so that it would be unlikely to have all these neighbouring pixels affected similarly by transmission errors. In prior art methods however, as particularly taught by US patent application 2009/0021646, the partitioning is performed irrespective of the number of available communication channels or transmission paths. This may result in having several corrupted pixels within a single partitioning block if a same communication channel is used for transporting these several pixels. Consequently, the diversity of the communication channels transporting the neighbouring pixels is lowered and the efficiency of the reconstruction reduced.

According to an embodiment of the invention, the size of the partitioning blocks is adapted to match the number of available communication channels. This guarantees to have a full diversity within each partitioning block and thus maximizes the diversity of the communication channels transporting the pixels neighbouring the pixel to be reconstructed as illustrated in the FIGS. 7a to 7e.

Figure 5:
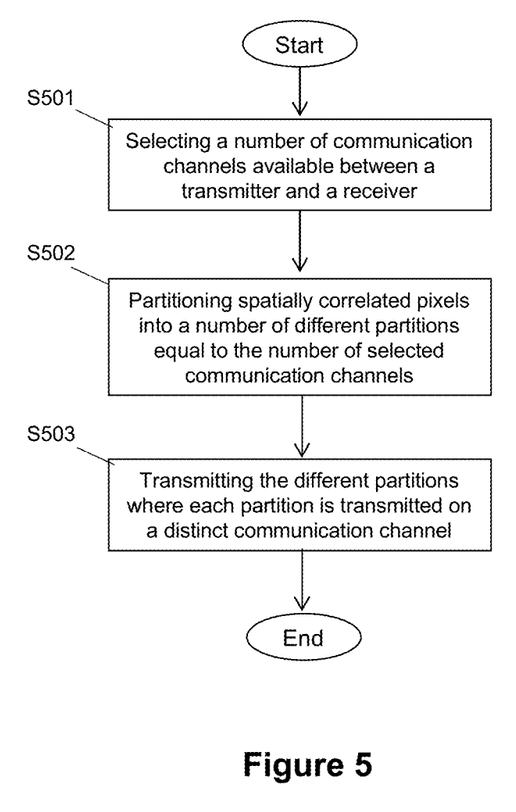
FIG. 5 is a flowchart of a segment of a program that shows the partitioning and the transmitting of a video frame according to an embodiment of the invention.

FIG. 5 is a flowchart of a segment of the program stored in the ROM 350 of first device 110 and shows main steps of transmitting a video frame according to an embodiment of the invention.

At step S501, a number of available communication channels between the first device 110 (transmitter) and the second device 120 (receiver) is selected.

A communication channel is available if it is possible to correctly decode data received via the communication channel. For example, it can be determined if a communication channel is available if an average SNR of radio packets received through the communication channel is above a predetermined threshold. It can also be determined that a communication channel is available if its capacity or offered bandwidth is above a minimum threshold for a given SNR so as to be capable of transporting the required data.

In one implementation, the available communication channels are obtained by regularly measuring the SNR of received signals through different communication channels and comparing the measured SNR to the predetermined threshold. The measuring of the SNR can be first performed during a discovery phase prior any transmission of video information and then regularly updated during the transmission of the video information to keep track of the number of available communication channels. The selecting step S501 is preferably executed each time the number of available communication channels changes so as to optimize communication system performances.

In order to increase spatial diversity and to maximize the number of available communication channels, a search for indirect (NLOS) transmission paths between the transmitter and the receiver is performed using antenna scan for example by tracking the strongest received signals. The discovery of available communication channels that can be used for communication is performed cooperatively between the transmitter Tx at device 110 and the receiver Rx at device 120 so that each of these devices configure its wireless transceiver 330 to be adapted to transmit or to receive via those communication channels.

Communication channels based on distinct transmission paths are preferably selected to favour spatial diversity. It is furthermore preferable to select only those communication channels based on distinct transmission paths. As the wireless transceiver 330 of the receiver Rx is adapted to receive via all available communication channels agreed with the transmitter Tx, it can still receive from any selection of those communication channels decided by the transmitter Tx.

At step S502, spatially correlated pixels of each video frame are partitioned into a number of different partitions equal to the number of selected communication channels, i.e. the size of the partitioning block 410 is set equal to the number of selected communication channels. The partitioning step S502 is executed each time the selected number of communication channels changes to adapt the number of partitions to the number of selected communication channels.

In a preferred implementation of the invention, the shape of the partitioning block 410 is also adapted based on the number of selected communication channels as will be described hereinafter with reference to FIG. 6.

At step S503, the different partitions are transmitted to the receiver, where each partition is transmitted on a distinct communication channel. As described in the packetizing scheme of FIG. 4, the different partitions can be included in different video packets for their transmission to the receiver 120.

Figure 6:
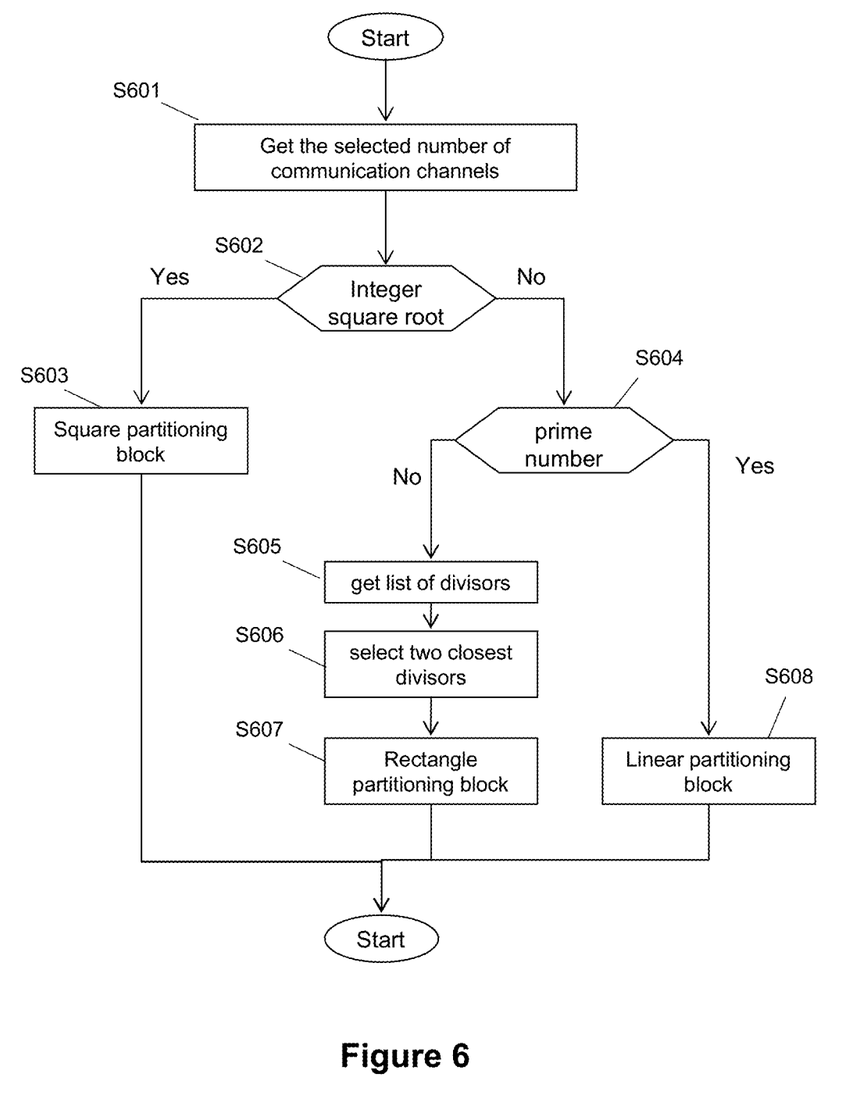
FIG. 6 is a flowchart showing the main steps of determining the shape of a partitioning block according to an embodiment of the invention.

FIG. 6 is a flowchart of a segment of the program stored in the ROM 350 of first device 110 and shows main steps of determining the partitioning block shape.

At step S601, the number of communication channels selected at step S501 is retrieved. This number is used to set the shape of the partitioning block 410. If it is determined at a test step S602 that the number of communication channels has an integer square root, the partitioning block shape is set, at a next step S603, to a square of sides equal to the square root. If it is determined at the test step S602 that the number of communication channels doesn't have an integer square root, a further test step S604 is performed to check whether this number is prime. If the number of communication channels is not a prime number, the list of its divisors is obtained at step S605, then the two divisors of said number which are closest to each other and whose product equals said number of communication channels are selected at a next step S606 to set, at a following step S607, the partitioning block shape to a rectangle of sides equal to the two selected divisors. According to a preferred implementation, the horizontal side of the rectangle (corresponding to a row of the video frame) is chosen greater than the vertical side (corresponding to a column). As the video frame is typically retrieved row by row from the application unit 310, having fewer rows in the partitioning block reduces the partitioning time and thus the transmission latency. Referring again to the test step S604, if the number of communication channels is a prime number, a linear shape is chosen at step S608 for the partitioning block which means that the dimensions of the partitioning block are one pixel for one side and the selected number of communication channels for the other side. Again, preference is given to one-row multiple-column linear partitioning blocks.

FIGS. 7a to 7e illustrate different partitioning examples that can be obtained after running the flowchart of FIG. 6 over a video frame (only part of it is shown). For illustrative purposes, the selected communication channels are numbered from 1 up to 6 depending on the presented example. In these figures, each pixel holds the number of the communication channel over which it will be transported.

Figure 7A:
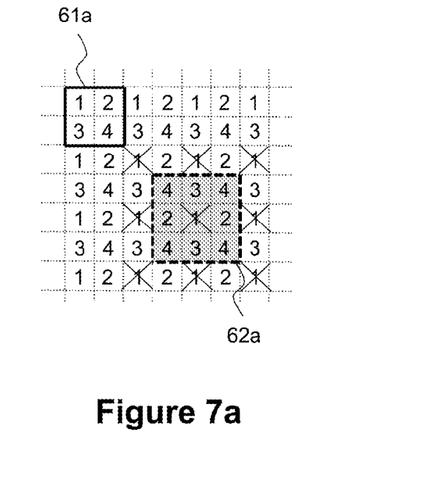
FIGS. 7a to 7e illustrate different partitioning and concealment strategies.

FIG. 7a illustrates the implementation of a square partitioning block 61a for partitioning the pixels of the video frame (similarly to the partitioning presented in FIG. 4). This partitioning guarantees that all close neighbouring pixels of each given pixel of the video frame are transported in communication channels that are distinct from the one transporting the given pixel. For example, if communication channel 1 is blocked, all pixels transported over this communication channel are lost or damaged (some of them shown as being crossed-out in the figure) and need to be reconstructed. A reconstruction block 62a comprising close neighbouring pixels is formed around each pixel to be reconstructed for applying error concealment. These neighbouring pixels were transported over non-blocked communication channels 2, 3 and 4.

Figure 7B:
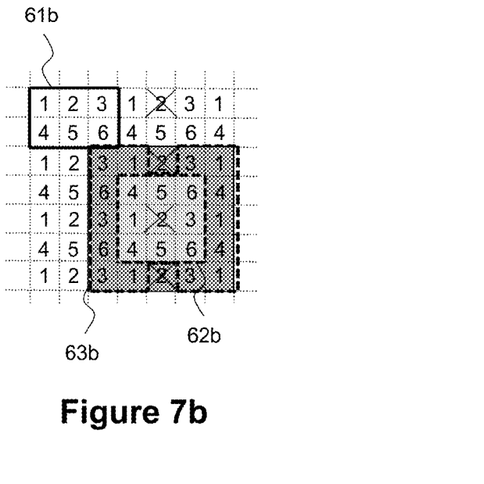

FIG. 7b illustrates the implementation of a rectangle partitioning block 61b for partitioning the pixels of the video frame. As the number of selected communication channels is higher, i.e. 6, greater diversity in the distribution of communication channels is provided. Thanks to this greater diversity, the reconstruction of pixels transported over one blocked communication channel, i.e. 2, can use, in addition to a reconstruction block 62b formed by close neighbouring pixels, an extended reconstruction block 63b formed by second level neighbouring pixels, excluding the two pixels transported by the blocked communication channel. The extended reconstruction block brings more spatial information that can be used for enhancing the error concealment.

Figure 7C:
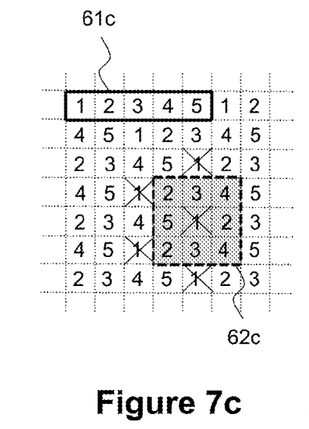
Figure 7D:
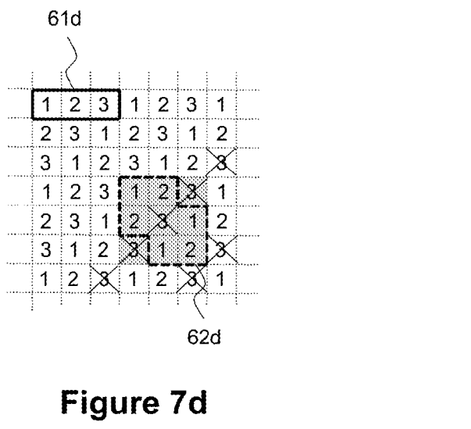
Figure 7E:
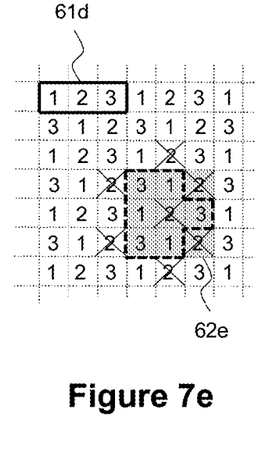

FIGS. 7c, 7d and 7e illustrate the implementation of a linear partitioning blocks 61c, 61d and 61e. For linear partitioning blocks, it is preferable to have a shift of typically two pixels between the different rows of the video frame when applying the partitioning. This avoids to have pixel errors aligned at the same column and maximizes the diversity of communication channels within a reconstruction block. A linear partitioning block of size 3 is a particular case that can be implemented by shifting the block by two pixels from one row to another (FIG. 7d) or by one pixel per row in different directions (FIG. 7e). The embodiment of FIG. 7e is preferred because it avoids having pixel errors aligned along the diagonal. In fact, avoiding pixel errors alignments make them visually less noticeable.

The aim is to avoid having one communication channel transporting a given pixel to be assigned for transporting one of the pixel of the reconstruction block formed by at least the close neighbouring pixels, as it is the case for example for the reconstruction block 62c. If that is not possible because of insufficient number of available communication channels, lost or damaged pixel values should be excluded from the reconstruction blocks, as is the case for blocks 62d and 62e.

Figure 8:
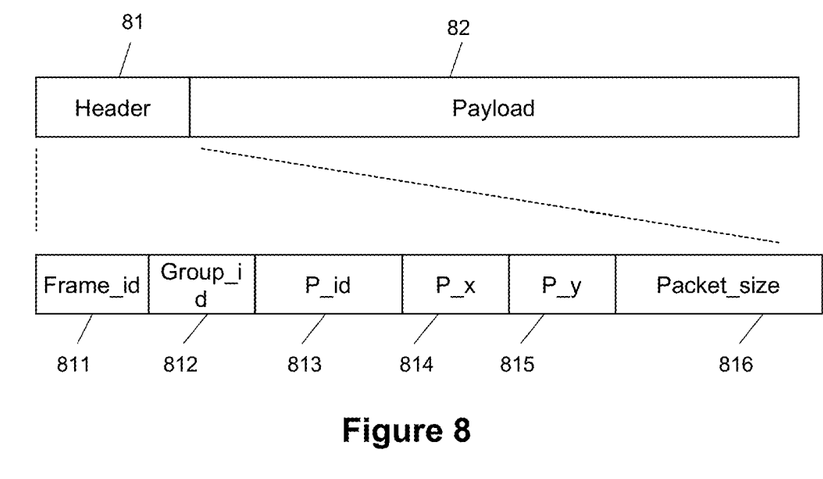
FIG. 8 shows an example of the format of a video packet used to transport the different pixel partitions.

FIG. 8 shows an example of the format of a video packet used to transport the different pixel partitions. In case of a square partitioning block of 4 pixels, the video packet corresponds to one of the packets 431 to 434 shown in FIG. 4.

The video packet contains a payload field 82 for transporting the values of the different pixel partitions and a header field 81 for transporting signaling information. Signaling information is used in one implementation of the invention to make it possible for the receiver to recompose the video frames from the different pixel partitions that were received in a distributed manner over different video packets, particularly in the presence of packet losses and/or reordering.

The header field 81 comprises the following sub-fields.

- A frame identifier Frame_id 811 (4 bits) that makes it possible to associate the packet to a given video frame.
- A group identifier Group_id 812 (4 bits) that indicates to which group of pixels in the video frame the video packet relates. This is adapted to a video frame divided into groups as illustrated in FIG. 4.
- A partition identifier P_id 813 (10 bits) that indicates to which partition in the partitioning block the pixels of the video packet relate. Alternatively, the two fields Group_id and P_id can be replaced by a coordinates field (with a larger number of bits, e.g. 16 bits) that holds the coordinates in the video frame of the first pixel of the partition transported in the video packet. This latter can cope with less regular dividing of the video frame into groups, i.e. a group can start anywhere in the frame, but with a larger number of bits as indicated above.
- The width P_x 814 (5 bits) and the height P_y 815 (5 bits) of the partitioning block used for partitioning the group of pixels. This gives on one hand the size of the partitioning block (P_x. P_y), and on the other hand the corresponding shape chosen by the transmitter, i.e. square, linear or rectangle. Alternatively, these two fields can be omitted if a same deterministic algorithm is used both at the transmitter and at the receiver for determining the size and the shape of the partitioning block from the number of selected communication channels. In this case the number of selected communication channels is communicated using a dedicated field in each video packet or via a separate signalling.
- The size of the video packet Packet_size 816 (16 bits).

Figure 9:
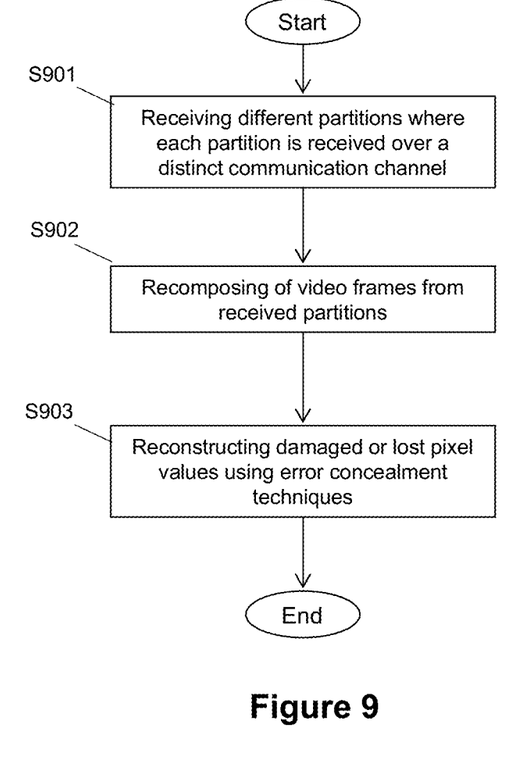
FIG. 9 is a flowchart showing the main steps of receiving a video frame.

FIG. 9 is a flowchart of a segment of the program stored in the ROM 350 of second device 120 and shows main steps of receiving a video frame according to an embodiment of the invention.

At step S901, video packets transporting the different partitions are received over the different selected communication channels. Either the receiver has knowledge of the communication channels selected by the transmitter for sending the different video packets, in which case it is enough for the receiver to monitor only those selected communication channels. Or the receiver hasn't such knowledge in which case it has to monitor all available communication channels agreed with the transmitter Tx.

At step S902, each video frame is recomposed from the pixel partitions that were received in a distributed manner in different video packets over the selected communication channels using signaling information contained in those video packets.

At step S903, if some pixel values are lost or damaged in the recomposed video frame, they are reconstructed based on the pixels values of the reconstruction blocks as described above with reference to FIGS. 7a to 7e. The reconstruction of the pixel values uses known error concealment techniques such as averaging.

The invention claimed is:

1. A method of transmitting a video frame from a transmitting device to a receiving device, the method comprising the following steps executed in the following order:
   selecting a number of communication channels available between the transmitting and the receiving devices;
   partitioning spatially correlated pixels of the video frame into a number of different partitions equal to the number of selected communication channels by defining linear blocks of pixels for partitioning the pixels of the video frame, wherein the number of pixels per block equals the selected number of available communication channels and wherein the linear blocks are staggered by shifting by at least one pixel from one row to another; and assigning each pixel of a block to a distinct partition; and transmitting the different partitions, where each partition is transmitted on a distinct communication channel among the selected communication channels.

2. A method according to claim 1, wherein the partitioning comprises staggering of linear shape blocks to avoid whole columns and diagonals of the video frame being in the same partition.

3. A method according to claim 1, wherein the selecting step is executed each time the number of available communication channels changes.

4. A method according to claim 3, wherein the partitioning step is executed each time the selected number of communication channels changes to adapt the number of partitions to the number of selected communication channels.

5. A method according to claim 1, wherein different communication channels correspond to different transmission time slots and/or different transmission paths.

6. A method according to claim 5, wherein only communication channels based on distinct transmission paths are selected in the selecting step.

7. A method according to claim 1, wherein the maximum number of communication channels is selected at the selecting step among the available communication channels.

8. A method according to claim 1, wherein the step of transmitting the partitions comprises a step of placing pixels from different partitions into different packets.

9. A method according to claim 1, further comprising transmitting via at least one said communication channel information for use by the receiving device to identify the partitioning blocks.

10. A method according to claim 9, wherein the information comprises one or more of the following features of a partitioning block: a size of the block; a shape of the block; a dimension of the block; and the number of pixels contained in the block.

11. A method of receiving a video frame transmitted by the transmitting method of claim 1, comprising employing, in the event that data of a pixel belonging to one said partition is lost or corrupted in transmission, received data of one or more pixels belonging to one or more other said partitions, and using said received data to produce an estimate of the lost or corrupted data.

12. A method according to claim 11, further comprising defining a reconstruction block for a target pixel having lost or corrupted data, the reconstruction block comprising predetermined pixels that neighbour the target pixel and that belong to said other partitions.

13. A method according to claim 12, wherein the video frame is transmitted and wherein the reconstruction block is different from a partitioning block.

14. A method of receiving a video frame transmitted by the transmitting method of claim 1, comprising receiving from the transmitting device information about the number of selected communication channels and employing the received information to determine the partitioning applied by the transmitting device.

15. A non-transitory storage medium storing a program which, when run on a computer or processor, causes the computer or processor to carry out the method of claim 1.

16. A non-transitory storage medium storing a program which, when run on a computer or processor, causes the computer or processor to carry out the method of claim 11.

17. A transmitting device for transmitting a video frame to a receiving device, the transmitting device comprising:

means for selecting a number of communication channels available between the transmitting and the receiving devices;

means operable following the selection of the number of communication channels to partition spatially correlated pixels of the video frame into a number of different partitions equal to the number of selected communication channels wherein the means to partition is operable to define linear blocks of pixels, wherein the number of pixels per block equals the selected number of available communication channels and wherein the linear blocks are staggered by shifting by at least one pixel from one row to another, and to assign each pixel of a block to a distinct partition; and a transmitter for transmitting the different partitions where each partition is transmitted on a distinct communication channel among the selected communication channels.

* * * * *